Patented Nov. 25, 1952

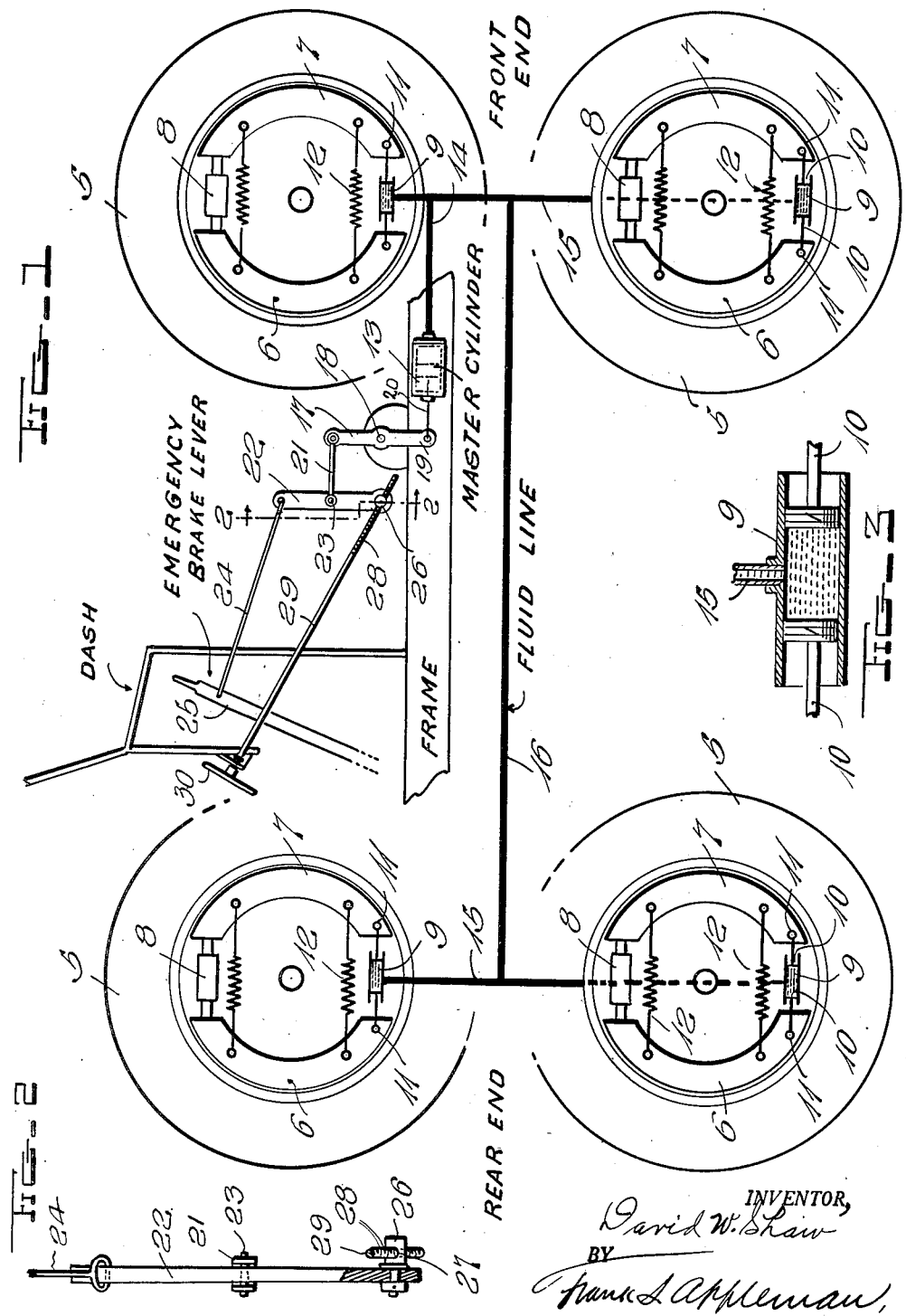

2,619,203

UNITED STATES PATENT OFFICE 2,619,203

EMERGENCY BRAKING SYSTEM

David W. Shaw, Parma, Mo.

Application March 28, 1947, Serial No. 737,933

2 Claims. (Cl. 188—152)

This invention relates to an emergency braking system for automobile wheels and is an added precautionary mechanism for holding the brakes set, including operative means reaching to the operator of the automobile whereby the brake shoes are applied or released.

An object of this invention, in addition to the foregoing, is to provide brake shoe expanding and contracting cylinders as adjuncts to the brake shoe operating mechanism usually installed in automobiles where fluid or pneumatic actuating means are employed, and an object of the invention is to provide a pressure cylinder with means connecting the said cylinder with the cylinders having means for operating the brake shoes, the first mentioned cylinder being preferably designated as a "master cylinder," which term will be hereinafter employed as referring to said cylinder.

A further object of the invention is to provide a control for the master cylinder, manually operated by the driver of the vehicle, and novel means are also provided for regulating the movement of the emergency brake lever as to the pressure developed in the master cylinder.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a diagrammatic view, showing the emergency brake mechanism associated with the front and rear wheels of an automobile;

Figure 2 illustrates a detail transverse vertical section taken on line 2—2 of Figure 1; and Figure 3 illustrates a detail view showing the equipment between the ends of the brake shoes for operating the emergency brake.

In the present embodiment of the invention each wheel 5 has suitably mounted brake shoes 6 and 7, having their ends operatively connected to a pressure cylinder 8, and these cylinders 8 are a part of the ordinary braking system of an automobile which are supplied with an expanding medium, operative to apply the brakes or release them. As such systems are well known, it is believed unnecessary for an understanding of the invention to illustrate any of the systems by which the brakes are operated or controlled from the ordinary brake pedal of an automobile.

In installing the emergency braking system, an expansion cylinder 9 is interposed between the two ends of the brake shoe opposite those to which the expansion cylinder 8 is connected, and the said expansion cylinder 9 has suitable pistons 10 projectible in opposite directions from the cylinder 9, and these pistons 10 are connected to the brake shoes, as at 11, in any suitable manner. The brake shoes are held under tension of springs 12, 12, which have their ends connected to the brake shoes 6 and 7, and the springs operate to retract or maintain the brake shoes out of operative engagement with a brake drum with which they coact. The installation just described as being applied to the wheel is provided for each of the wheels.

A master cylinder 13 is installed on the frame or other part of the automobile and it has a pressure supply pipe 14 leading from it, and the supply pipe is connected to fluid lines 15 which communicate with the cylinders 9, there being a connecting fluid line 16 communicating with the lines or pipes 15 so that the braking system is supplied with pressure from the master cylinder. The pressure in the master cylinder is under control of a piston operating therein against the fluid contents in the cylinder, so that by moving the piston inwardly, pressure is exerted through the fluid lines to the cylinders 9 when the emergency brake is to be set, and when the emergency brake is to be released, the piston of the master cylinder is moved outwardly to release the pressure.

As a means for the manual operation of the piston, a cross arm 17 is pivotally mounted on a stud 18, and one end 19 of the cross arm is connected to the piston of the master cylinder by a piston rod 20, and the other end of the cross arm has a link 21 pivotally connected to it, and the said link 21 is connected to another cross arm 22 by a pivot 23. A link 24 is connected to one end of the cross arm 22 and it is pivotally connected or otherwise attached to a brake lever 25 which is the emergency brake lever which sets the emergency brakes to which reference has been made. The lower end of the cross arm has a stud 26 rotatably applied to the said cross arm, and the said stud has a threaded aperture 27 in which a threaded portion 28 of an adjusting rod 29 is movable, the said adjusting rod having a handle 30 by which it is manipulated so that the threaded portion of the rod may operate to pull the lower end of the cross arm 22 inwardly toward the operator, or it may be manipulated to move it outwardly, by which movement the pressure in the master cylinder is regulated.

As indicated by the above description, the invention contemplates the use of two hydraulically-operated braking systems, while employing the brake shoe equipment in common between the two systems; one of the systems is the usual service braking system operated by the usual brake pedal; other than the cylinders 8, this system is not disclosed in the drawings for reasons pointed out above. The other system is the emergency system operated by the emergency lever, this being disclosed in detail in the drawings, and includes the cylinders 9.

There is no connection hydraulically between the two systems, but there is an indirect connection between the two systems mechanically through the brake shoes 6, 7, due to the fact that cylinders 8 and 9 are individually mounted at the opposite ends of the pair of brake shoes, the result being that when one system is made active, the cylinder of the other system controls the position of the axes upon which each brake shoe has its movement to apply the shoes to the brake drum by the activity of the cylinder of the first system. Hence, the brake shoes form a mechanical connection between the two systems, since adjustments made in the emergency system, for instance, will not only affect the operation of that system, but indirectly affect the other system by varying the position of the axes of brake shoe operation by such other system, and, because of this, can be a control factor in the normal service system.

This possibility forms a fundamental feature of the present invention, through the fact that with the adjusting mechanism extending to the instrument panel, it is possible for the operator to sufficiently control both systems to assure the proper operation of each. This is especially valuable because the adjustments may be made at any time and thus remedy faulty control conditions, but is especially advantageous in meeting the conditions of the expansion and contraction of the hydraulic fluid due to climatic conditions. For instance, if there be expansion of the fluid, it could possibly affect the operation of both systems, since, if severe enough, it could move the brake shoes into braking position and prevent freedom from braking action, since the expansion would affect both ends of the brake shoes; this can be relieved by shifting the axes on which the brake shoe is being fulcrumed; obviously, a similar remedy may be applied when the fluid is contracted to avoid delays in brake application. The adjusting action is thus made available to the operator of the car while the latter is being operated. A similar effect is present when correcting for wear conditions of the brake shoes.

The adjustment possibilities are made active directly upon the emergency system. The master cylinder forms a reservoir for the hydraulic fluid of that system and by moving fluid from and to such cylinder, the amount of fluid actually present in the working parts of the system to augment or starve the working zone is readily controlled by the operator. This is the function of the leverage control in which lever 17 is a lever of the first order while lever 22 is a lever of the second order; hence, by adjusting the position of the lower end of lever 22 by the adjusting member 29 the connection 23 is shifted and thus rocks lever 17 through link 21. Rocking of lever 17 is operative to shift the piston of the master cylinder and thus supply fluid to the working parts of the system or to withdraw fluid from such parts; since the connection between 29 and lever 22 is a threaded connection, the required adjustments can be made with great accuracy.

The two braking systems, while operatively connected mechanically through the brake shoes, as above explained, the systems are completely separated hydraulically, thus requiring the use of two separate operating structures—the usual brake pedal for controlling the normal service braking activities, and the emergency lever for emergency braking; because of this either can be rendered active individually at will, neither requiring activity of the other for its own activity. This is made possible through the fact that the adjustments above referred to to meet climatic conditions or to meet other operating conditions, as brake-shoe wear, for instance, are provided separate from either the brake pedal or the emergency lever—either is capable of being rendered active at will to provide its expected braking action. Hence, the car can be braked by the pedal for service control, can be braked while at rest through the emergency lever, or the latter can be applied in service to meet emergency conditions and permit complete freedom as to pedal operation; since one actuator is under foot control while the other is under hand control, the activity as to both is wholly individual. Even if the pedal is active—thus affecting the ends of the brake-shoes immediately controlled by the cylinder 8 to thereby shift the fulcrum point at such end—the emergency lever can be operated in the usual manner to meet a sudden emergency, with the foot pedal still active and thus tending to shorten the length of throw of the lever; under such conditions, the pedal can be released at once—thus changing the fulcrum—and the desired conditions restored by further advance of the emergency lever, thus permitting the operator to leave his car or shift his position, since the emergency lever is locked in position by its pawl and ratchet mechanism.

As will be understood, the adjustments provided by the threaded connection between threaded rod 29 and pin 26 have the physical effect of advancing or retracting the piston of master cylinder 13, the action being due to the fact that lever 25 is being held in fixed position during the period of adjustment, the upper end of lever 22 being held in fixed position by 24, while the lower end of 22 is advanced or retracted by the adjustment, the result being that link 21 advances or recedes, depending upon the direction of adjustment. Obviously, this movement of the link moves the upper end of lever 17 correspondingly, thus rocking lever 17 to advance or retract the master cylinder piston.

However, the underlying purpose of such adjustment is not simply to advance or retract the piston by providing the movement of the piston, but also to regulate the extent of service movement of the piston. This can be understood from the fact that in actual service, it is the lever 25 that is actuated during the emergency period, rod 29 remaining stationary during the period, the adjustment being provided while lever 25 is inactive, at which time the master cylinder piston is also in its inactive extreme position. When, therefore, the position of the piston is changed by the adjustments referred to, the action is that of changing such inactive extreme position, so that when lever 25 is made active, the piston is moved from the new adjusted position, thereby affecting the operation of the emergency system, since, with advance of the piston of 13 a greater amount of fluid is concentrated within the cylinders 9 and the connections leading thereto; while if the piston is retracted, the fluid content in cylinder 9 is reduced in volume, all of the cylinders 9 being affected in this manner through the single adjustment by 28—30. Since the change in volume in cylinders 9 inherently affects the adjusted positions of the corresponding ends of the brake shoes, it is apparent that the extent of service movement of the shoes is varied by such adjustment.

And since the effect of piston movement inherently affects the position of the corresponding ends of the brake shoes, it is apparent that such adjustment can also affect the normal operation of the brakes by cylinders 8. The adjustment of the spacing of the cylinder 9 ends of the shoes while the cylinder 8 ends and the emergency lever 25 are stationary (which produces the above results), inherently changes the relation of the opposite ends of the shoes relative to the brake drum; hence after the adjustment, the action of the shoes on the drum is varied from the previous action, whether the braking is the normal braking through cylinders 8 or the emergency braking through cylinders 9, due to the change made through the manual adjustment, through 30, of the inactive extreme position of the piston of 13 referred to above, an adjustment that is made active concurrently on all of the cylinders 9 through the adjustment of this position of piston of the master cylinder.

In other words, the adjustment of 28—30, while independent of the activity of either the regular or emergency braking system, sets the inactive extreme of the piston of cylinder 13, thus controlling the extent of movement which can be applied to the piston during emergency lever application, in which system the cylinder is active. Since, however, such adjustment of the piston varies the normal amount of content of each cylinder 9, the reaction to such adjustment is to vary the distance between the fulcrum points of the brake shoes at this end of the latter, thereby making possible a shift in the normal inactive positions of such fulcrum points, an action which inherently changes the relation of the shoe braking surface to the brake drum—due to the fact that the normal inactive position of the cylinder 8 ends of the shoes remains constant—with the result that braking action of the regular braking system is changed accordingly; the adjustment can therefore affect both systems although actually made in the emergency system alone. The change in the fulcrum point location at the cylinder 9 end of the shoes is thus made beneficial in both systems and enables accuracy in the positioning of the shoe braking surfaces as well as permitting wear effects on the shoe surfaces to be corrected in a simple manner.

I claim:

1. For use in wheel hydraulic brake assemblies, wherein the assembly includes wheel hydraulic brake structure including a master cylinder having an actuator for moving hydraulic fluid of the assembly, adjustable linkage for operating the actuator, said linkage comprising an oscillatably mounted cross arm, one end of which communicates motion to the actuator in the master cylinder, a link pivotally connected to the other end of the cross arm, a lever to which the link is pivoted, a manually operated lever having means of connection to one end of the last mentioned lever, and means for adjusting the position of the said lever whereby the extent of service movement of the actuator in the master cylinder is regulated.

2. For use in wheel hydraulic brake assemblies, wherein the assembly includes wheel hydraulic brake structure including a master cylinder having an actuator for moving hydraulic fluid of the assembly, adjustable linkage for operating the actuator, said linkage comprising an oscillatably mounted cross arm, one end of which communicates motion to the actuator in the master cylinder, a link pivotally connected to the other end of the cross arm, a lever to which the link is pivoted, a manually operated lever having means of connection to one end of the last mentioned lever, and means for adjusting the position of the said lever whereby the extent of service movement of the actuator in the master cylinder is regulated, the said means for regulating the movement of the actuator including a threaded rod rotatably mounted in the automobile, and an apertured stud swiveled in the said lever and into the aperture of which stud the threaded rod engages.

DAVID W. SHAW.

REFERENCES CITED

The following references are of record in the file of this patent:

UNITED STATES PATENTS

| Number | Name | Date |
| --- | --- | --- |
| 1,679,154 | Christensen | July 31, 1928 |
| 1,696,729 | Rackham | Dec. 25, 1928 |
| 2,018,912 | Carroll | Oct. 29, 1935 |
| 2,126,296 | Weihe | Aug. 9, 1938 |
| 2,195,558 | Bowen | Apr. 2, 1940 |
| 2,324,007 | MacPherson | July 13, 1943 |
| 2,355,143 | Burnett | Aug. 8, 1944 |

FOREIGN PATENTS

| Number | Country | Date |
| --- | --- | --- |
| 424,911 | England | 1935 |